United States Patent
Li et al.

(10) Patent No.: US 11,704,243 B2
(45) Date of Patent: *Jul. 18, 2023

(54) ACTIVE-ACTIVE STORAGE SYSTEM AND ADDRESS ASSIGNMENT METHOD

(71) Applicant: HUAWEI TECHNOLOGIES CO., LTD., Guangdong (CN)

(72) Inventors: Tiande Li, Shenzhen (CN); Langbo Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,144

(22) Filed: Oct. 31, 2022

(65) Prior Publication Data
US 2023/0050016 A1 Feb. 16, 2023

Related U.S. Application Data

(63) Continuation of application No. 16/854,150, filed on Apr. 21, 2020, now Pat. No. 11,507,505, which is a (Continued)

(30) Foreign Application Priority Data

Oct. 25, 2017 (WO) ................ PCT/CN2017/107701

(51) Int. Cl.
*G06F 12/06* (2006.01)
*G06F 9/455* (2018.01)

(52) U.S. Cl.
CPC ...... *G06F 12/0646* (2013.01); *G06F 9/45558* (2013.01); *G06F 2009/45583* (2013.01)

(58) Field of Classification Search
CPC ....... G06F 9/45558; G06F 2009/45583; G06F 12/064; G06F 12/0646; G06F 12/0653; G06F 12/0661; G06F 12/0669
(Continued)

(56) References Cited

U.S. PATENT DOCUMENTS 8,898,519 B1  11/2014 Natanzon et al.
9,032,164 B2 *  5/2015 Rupanagunta ........ G06F 3/0607
                                                  711/202
(Continued)

FOREIGN PATENT DOCUMENTS

CN  101702115 A  5/2010
CN  102405460 A  4/2012
(Continued)

OTHER PUBLICATIONS

English Translation of the Written Opinion of the International Searching Authority for PCT/CN2017/108641 dated Aug. 17, 2019 (Year 2019).

(Continued)

*Primary Examiner* — Reginald G Bragdon
*Assistant Examiner* — Aaron D Ho
(74) *Attorney, Agent, or Firm* — Huawei Technologies Co., Ltd.

(57) ABSTRACT

A method of labeling logic number units in a storage system results in the use of the same label for related LUNs in different storage arrays. A first storage array includes a first source logical unit number LUN, the second storage array includes a first target LUN, and the first source LUN and the first target LUN are a pair of active-active LUNs. The first storage array sends an assignable-address set of selectable labels for the first source LUN to the address assignment apparatus. The second storage array sends an assignable-address set of selectable labels for the first target LUN to the address assignment apparatus. The address assignment apparatus selects a label that is in both assignable-address (Continued)

sets of the first source LUN and first target LUN, and assign that selected label to both LUNs. Thereafter, the address assignment apparatus sends the selected label to the first storage array and the second storage array for identifying both the first source LUN and the first target LUN.

8 Claims, 6 Drawing Sheets

Related U.S. Application Data continuation of application No. PCT/CN2017/108641, filed on Oct. 31, 2017.

(58) Field of Classification Search
USPC .......................................................... 711/202
See application file for complete search history.

(56) References Cited

U.S. PATENT DOCUMENTS

| | | | |
|---|---|---|---|
| 9,081,594 B1 | | 7/2015 | Labonte et al. |
| 9,218,252 B1 | | 12/2015 | Revur et al. |
| 9,400,611 B1 | | 7/2016 | Raizen |
| 9,460,028 B1 | * | 10/2016 | Raizen ................ G06F 3/0617 |
| 2003/0188218 | A1 * | 10/2003 | Lubbers ............. G06F 11/2079 |
| | | | 714/5.11 |
| 2008/0270695 | A1 | 10/2008 | Ninose |
| 2015/0046661 | A1 | 2/2015 | Gathala et al. |
| 2016/0110264 | A1 * | 4/2016 | Mehta ................ G06F 11/1662 |
| | | | 707/679 |
| 2017/0371597 | A1 | 12/2017 | Jia et al. |

FOREIGN PATENT DOCUMENTS

| | | | | |
|---|---|---|---|---|
| CN | 104423889 A | | 3/2015 | |
| CN | 105431827 A | * | 3/2016 | ........... G06F 12/023 |
| CN | 105431827 A | | 3/2016 | |
| CN | 106250048 A | | 12/2016 | |
| CN | 106557280 A | * | 4/2017 | ........... G06F 3/0614 |
| CN | 106557280 A | | 4/2017 | |
| CN | 106775481 A | | 5/2017 | |
| CN | 106909307 A | | 6/2017 | |
| JP | 2005196490 A | | 7/2005 | |
| JP | 2008269469 A | | 11/2008 | |
| JP | 2009093316 A | | 4/2009 | |
| WO | 2004001604 A1 | | 12/2003 | |
| WO | 2014181406 A1 | | 11/2014 | |

OTHER PUBLICATIONS

Bai Yufeng,"Local storage active-active deployment scheme based on the array active-active function", Information and Communications (Sum. No. 169),dated Jan. 31, 2017,total 3 pages.

Maruthachalam et al.,"A distributed system design for next generation storage and remote replication",The Fifth International Conference on the Applications of Digital Information and Web Technologies (ICADIWT 2014),dated Feb. 19, 2014,total 6 pages.

* cited by examiner

| Bit Octet | 7 | 6 | 5 | 4 | 3 | 2 | 1 | 0 |
|---|---|---|---|---|---|---|---|---|
| 0 | Address method | | Bus identifier | | | | | |
| 1 | Identifier of a LUN | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

| Bit Octet | 7 | 6 | 5 | 4 | 3 | 2 | 1 | 0 |
|---|---|---|---|---|---|---|---|---|
| 0 | Address method | | Bus identifier | | | | | |
| 1 | Identifier of a level 1 LUN | | | | | | | |
| 2 | Address method | | Bus identifier | | | | | |
| 3 | Identifier of a level 2 LUN | | | | | | | |
| 4 | | | | | | | | |
| 5 | | | | | | | | |
| 6 | | | | | | | | |
| 7 | | | | | | | | |

ACTIVE-ACTIVE STORAGE SYSTEM AND ADDRESS ASSIGNMENT METHOD

CROSS-REFERENCE TO RELATED APPLICATIONS

This application is a continuation of U.S. application Ser. No. 16/854,150, filed on Apr. 21, 2020, which is a continuation of International Application No. PCT/CN2017/108641, filed on Oct. 31, 2017, which claims priority to International Application No. PCT/CN2017/107701, filed on Oct. 25, 2017. All of the aforementioned patent applications are hereby incorporated by reference in their entireties.

TECHNICAL FIELD

This application relates to the field of storage technologies, and in particular, to an active-active storage system and an address assignment method.

BACKGROUND

An active-active storage solution means that two data centers both are in a working state, and can undertake a same service at a same time, to improve a total service capability and a system resource utilization of the data centers. The two data centers are backups of each other. When one data center is faulty, a service can be automatically switched to the other data center without being interrupted. Layouts of the two data centers are the same. Each data center includes a level 1 logical unit number (LUN) and level 2 LUNs. The level 1 LUN is mounted to a host, and the plurality of level 2 LUNs are mounted to the level 1 LUN. The level 2 LUNs provide a storage service for the host, and the level 1 LUN does not store data. Each level 2 LUN in a first data center has a corresponding level 2 LUN in a second data center, and the two level 2 LUNs are a pair of active-active LUNs. For the host, the pair of active-active LUNs are used by the host as one LUN.

When the first data center is faulty, the host sends, to the second data center by using multipathing, a command that is originally destined to a level 2 LUN in the first data center. If addresses of level 2 LUNs in the two data centers are different, the second data center cannot find, based on address information carried in the command, a LUN in active-active pairing with the level 2 LUN in the first data center, and data may be written into another level 2 LUN. As a result, data in the two active-active LUNs is different.

SUMMARY

This application provides an active-active storage system, an address assignment apparatus, and an address assignment method, to implement address consistency between level 2 LUNs, thereby ensuring consistency of data in active-active LUNs.

A first aspect of this application provides an active-active storage system. The active-active storage system includes a first storage array, a second storage array, and an address assignment apparatus. The first storage array includes a first source logical unit number LUN, the second storage array includes a first target LUN, and the first source LUN and the first target LUN are a pair of active-active LUNs. That the first source LUN and the first target LUN are a pair of active-active LUNs specifically means that universally unique identifiers (Universally Unique Identifier, UUID) presented by the first source LUN and the first target LUN to a host are the same. The first storage array is configured to send an assignable-address set of the first source LUN to the address assignment apparatus, where the assignable-address set of the first source LUN includes a plurality of assignable addresses of the first source LUN. The second storage array is configured to send an assignable-address set of the first target LUN to the address assignment apparatus, where the assignable-address set of the first target LUN includes a plurality of assignable addresses of the first target LUN. The address assignment apparatus is configured to obtain a valid address from the assignable-address set of the first source LUN and the assignable-address set of the first target LUN, where the valid address is one assignable address in an intersection of the plurality of assignable addresses of the first source LUN and the plurality of assignable addresses of the first target LUN. The address assignment apparatus is further configured to send the valid address to the first storage array and send the valid address to the second storage array. In the active-active storage system provided in the first aspect, the first source LUN and the first target LUN both may be level 1 LUNs or level 2 LUNs. Regardless of whether the first source LUN and the first target LUN are level 1 LUNs or level 2 LUNs, consistency of LUN addresses can be implemented in the manner provided in the first aspect.

According to the first aspect, the first storage array and the second storage array respectively send the assignable-address sets of the LUNs to the address assignment apparatus. The address assignment apparatus obtains, from the assignable-address sets of the two LUNs, the valid address shared by the two LUNs, and then, separately sends the valid address to the first storage array and the second storage array, thereby implementing address consistency between the first source LUN and the first target LUN. When a fault occurs on a link A between the host and the first source LUN, the host switches to a link B between the host and the first target LUN by using multipathing software. The host sends, to the second storage array by using the link B, a data write command that is originally destined to the first storage array. Because the address of the first target LUN and the address of the first source LUN are the same, the second storage array can find the first target LUN based on the address, and write data carried in the data write command into the first target LUN. Because the first target LUN and the first source LUN are a pair of active-active LUNs, when the fault is rectified, the second storage array can copy the data into the first source LUN, thereby ensuring data consistency between the active-active LUNs.

In a first implementation of the first aspect, the address assignment apparatus is further configured to send a first address query command to the first storage array, where the first address query command is used to query the assignable addresses of the first source LUN, and the first storage array is specifically configured to send the assignable-address set of the first source LUN to the address assignment apparatus in response to the first address query command. The address assignment apparatus is further configured to send a second address query command to the second storage array, where the second address query command is used to query the assignable addresses of the first target LUN, and the second storage array is specifically configured to send the assignable-address set of the first target LUN to the address assignment apparatus in response to the second address query command. In this implementation, a process in which the first storage array and the second storage array send assignable addresses of level 2 LUNs to the address assignment apparatus is performed after address query commands sent by the address assignment apparatus are received.

With reference to the first aspect or the first implementation of the first aspect, in a second implementation of the first aspect, the first storage array further includes a second source LUN, the second storage array further includes a second target LUN, and the second source LUN and the second target LUN are a pair of active-active LUNs. The first storage array is further configured to: mount the first source LUN to the second source LUN, and generate the plurality of assignable addresses of the first source LUN, where each assignable address of the first source LUN includes a host LUN ID of the second source LUN and a host LUN ID of the first source LUN. The second storage array is further configured to: mount the first target LUN to the second target LUN, and generate the plurality of assignable addresses of the first target LUN, where each assignable address of the first target LUN includes a host LUN ID of the second target LUN and a host LUN ID of the first target LUN. In this implementation, it is further clarified that the first source LUN and the first target LUN are level 2 LUNs. The first source LUN is a level 2 LUN mounted to the second source LUN (a level 1 LUN), and therefore, each assignable address of the first source LUN includes the host LUN ID of the second source LUN and the host LUN ID of the first source LUN. The first target LUN is a level 2 LUN mounted to the second target LUN (a level 1 LUN), and therefore, each assignable address of the first target LUN includes the host LUN ID of the second target LUN and the host LUN ID of the first target LUN. In addition, according to the second implementation, address consistency between the level 2 LUNs is implemented in a process of mounting the level 2 LUNs to the level 1 LUNs. To ensure that the level 2 LUNs are normally used, the level 2 LUNs definitely need to be mounted to the level 1 LUNs. Therefore, if address consistency is implemented between the level 2 LUNs in this process, an additional operation is avoided so that the procedure is simplified.

With reference to the second implementation of the first aspect, in a third implementation of the first aspect, the host LUN ID of the second source LUN and the host LUN ID of the second target LUN are the same. Because an address of a level 2 LUN includes a host LUN ID of a level 1 LUN to which the level 2 LUN is mounted and a host LUN ID of the level 2 LUN itself, it further needs to be ensured that host LUN IDs of level 1 LUNs to which level 2 LUNs are mounted are the same.

With reference to the third implementation of the first aspect, in a fourth implementation of the first aspect, the first storage array is further configured to send an assignable-address set of the second source LUN to the address assignment apparatus, where the assignable-address set of the second source LUN includes a plurality of assignable addresses of the second source LUN, and each assignable address includes one assignable host LUN ID of the second source LUN. The second storage array is configured to send an assignable-address set of the second target LUN to the address assignment apparatus, where the assignable-address set of the second target LUN includes a plurality of assignable addresses of the second target LUN, and each assignable address includes one assignable host LUN ID of the second target LUN. The address assignment apparatus is further configured to obtain a valid address of a level 1 LUN from the assignable-address set of the second source LUN and the assignable-address set of the second target LUN, where the valid address of a level 1 LUN is one assignable address in an intersection of the plurality of assignable addresses of the second source LUN and the plurality of assignable addresses of the second target LUN, and the valid address includes the host LUN ID of the second source LUN. The address assignment apparatus is further configured to send the valid address of a level 1 LUN to the first storage array and send the valid address of a level 1 LUN to the second storage array. This implementation is used to ensure address consistency between level 1 LUNs, and is similar to the manner of ensuring address consistency between the level 2 LUNs.

With reference to any one of the foregoing implementations, in a fifth implementation of the first aspect, the active-active storage system further includes a host. The first storage array is further configured to send a first message to the host, to acknowledge that the valid address is an address of the first source LUN. The second storage array is further configured to send a second message to the host, to acknowledge that the valid address is an address of the first target LUN. The first storage array and the second storage array separately send the messages to the host, to acknowledge that the valid address has been used as the address of the first source LUN and the address of the first target LUN, or in other words, acknowledge that the valid address comes into effect. After the valid address comes into effect, the host can use the valid address to communicate with the first source LUN and the first target LUN.

It should be noted that the address assignment apparatus may be integrated into the host. In other words, the host executes the address assignment apparatus portion. Alternatively, the address assignment apparatus may be used as an independent server, for example, a quorum server.

A second aspect of this application provides an address assignment apparatus. The address assignment apparatus includes an interface and a processor. The interface is configured to: communicate with a first storage array, and communicate with a second storage array, where the first storage array includes a first source logical unit number LUN, the second storage array includes a first target LUN, and the first source LUN and the first target LUN are a pair of active-active LUNs. The processor is configured to perform functions implemented by the address assignment apparatus in any one of the first aspect and the implementations of the first aspect.

A third aspect of this application provides an address assignment method. The method is applied to the address assignment apparatus provided in the second aspect, and is performed by the address assignment apparatus. When the address assignment apparatus is integrated into a host, the method is performed by the host. When the address assignment apparatus is a quorum server, the method is performed by the quorum server.

A fourth aspect of this application provides an address assignment apparatus. The apparatus is configured to perform the method provided in the third aspect.

A fifth aspect of this application provides a computer program product, including a computer readable storage medium storing program code. The address assignment apparatus in the second aspect or the fourth aspect may execute an instruction included in the program code, to perform at least one method in the third aspect.

A sixth aspect of this application provides an active-active storage system. The active-active storage system includes a first storage array, a second storage array, and a host. The second storage array includes an address assignment apparatus. In other words, the address assignment apparatus is integrated into the second storage array. In the system, the host instructs the first storage array to mount a level 2 LUN.

The first storage array notifies the second storage array of a level 2 LUN mounting event. The second storage array sends a first address query command to the first storage array, to request to query assignable addresses of a first source LUN. The first storage array sends an assignable-address set of the first source LUN to the second storage array. The second storage array obtains a valid address based on the assignable-address set of the first source LUN and an assignable-address set of a local first target LUN. The second storage array feeds back a mounting success to the first storage array, and sends the address of the first target LUN to the first storage array. The first storage array feeds back the mounting success to the host, and sends the address of the first source LUN and the address of the first target LUN to the host.

According to the active-active storage system provided in the sixth aspect, the address assignment apparatus is located in the second storage array. The first storage array sends the assignable-address set of the LUN to the second storage array. The second storage array obtains, from the assignable-address sets of the two LUNs, the valid address shared by the two LUNs, and then, sends the valid address to the first storage array, thereby implementing address consistency between the first source LUN and the first target LUN. When a fault occurs on a link A between the host and the first source LUN, the host switches to a link B between the host and the first target LUN by using multipathing software. The host sends, to the second storage array by using the link B, a data write command that is originally destined to the first storage array. Because the address of the first target LUN and the address of the first source LUN are the same, the second storage array can find the first target LUN based on the address, and write data carried in the data write command into the first target LUN. Because the first target LUN and the first source LUN are a pair of active-active LUNs, when the fault is rectified, the second storage array can copy the data into the first source LUN, thereby ensuring data consistency between the active-active LUNs.

A seventh aspect of this application provides a storage array, configured to perform functions performed by the second storage array in the active-active storage system provided in the sixth aspect.

An eighth aspect of this application provides an address assignment method, applied to the active-active storage system provided in the sixth aspect, and executed by a first storage array and a second storage array.

A ninth aspect of this application provides a computer program product, including a computer readable storage medium storing program code. The first storage array and the second storage array in the active-active storage system in the sixth aspect may execute an instruction included in the program code, to perform at least one method in the eighth aspect.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

The technical solutions according to the embodiments of the present invention are clearly described in the following with reference to the accompanying drawings.

Figures 1, 2:
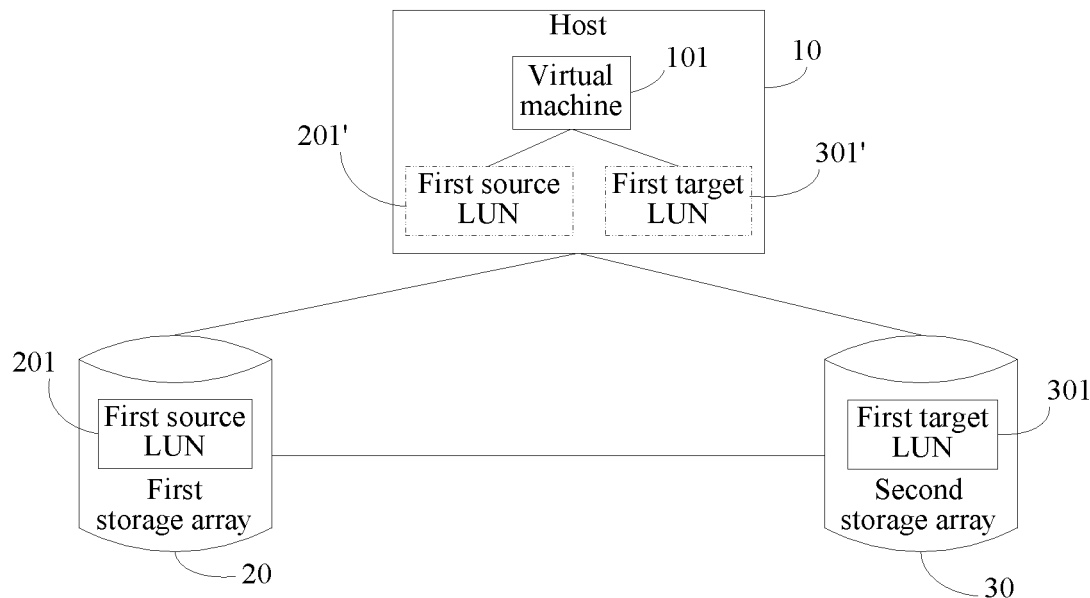
FIG. 1 is a system architecture diagram according to an embodiment of the present invention.
FIG. 2 is a schematic diagram of an address of a level 1 LUN according to an embodiment of the present invention.

FIG. 1 is a system architecture diagram according to an embodiment of the present invention. As shown in FIG. 1, a storage system includes an active-active array. The active-active array includes a first storage array 20 and a second storage array 30. The first storage array 20 and the second storage array 30 both may undertake a service of a host 10. The first storage array 20 includes a controller and a plurality of disks or solid-state drives. The controller may be a computing device, for example, a server or a desktop computer. An operating system and an application are installed on the controller. The controller is connected to the host 10 by using a storage area network (storage area network, SAN). The controller may receive an input/output (I/O) request from the host. The controller may further store data (if any) carried in the I/O request, and write the data into the disks. A structure of the second storage array 30 is similar to that of the first storage array 20. In this embodiment, a first source logical unit number (logical unit number, LUN) 201 provided in the first storage array 20 and a first target LUN 301 provided in the second storage array 30 are a pair of active-active LUNs. The pair of active-active LUNs provides a storage service for the host 10 as one LUN.

A plurality of virtual machines run on the host 10. A virtual machine 101 in FIG. 1 is merely an example one of the plurality of virtual machines. The first storage array 20 allocates the LUN 201 to the virtual machine 101, and the second storage array 30 allocates the LUN 301 to the virtual machine 101. The LUN 201 is mapped to an LUN 201' on the host 10. The first storage array 20 stores a mapping relationship between an identifier of the LUN 201 and an identifier of the LUN 201'. The LUN 301 is mapped to an LUN 301' on the host 10. The second storage array 30 stores a mapping relationship between an identifier of the LUN 301 and an identifier of the LUN 301'. In this embodiment, a virtual LUN that maps a storage array to the host is referred to as a host LUN. An identifier of the host LUN is referred to as a host LUN ID. For the ease of description, a link between the host 10 and the first storage array 20 is referred to as a link A, and a link between the host 10 and the second storage array 30 is referred to as a link B. The virtual machine 101 may access the LUN 201 by using the link A, and may also access the LUN 301 by using the link B. For example, when the virtual machine 101 needs to write data, the host 10 selects the link A or the link B by using multipathing software. A link selection principle may be a load balancing principle or another principle. Assuming that the link A is less occupied, the host 10 selects the link A, and the virtual machine 10 writes data into the LUN 201. To ensure data consistency between the LUN 201 and the LUN 301, after receiving the data, the second storage array 30 copies the data into the LUN 301. In addition, when either of the first storage array 20 and the second storage array 30 is faulty, the other storage array may continue to accept a service, to implement interruption-free service switching.

It is necessary to describe the concept of LUN herein. In actual application, physical disks in a storage array are logically combined, and a required RAID level is applied, to obtain a RAID set. The RAID set generally has a relatively large capacity because a plurality of disks are combined. Therefore, an available capacity of the RAID set is divided into relatively small units, referred to as logical units (logical unit), and a logical unit is allocated to the host depending on a storage requirement of the host. Each logical unit is allocated a unique identifier, that is, a logical unit number (logical unit number, LUN), and for the host, an organization and constitution of the RAID set are invisible to the logical unit number. A logical unit is referred to as a LUN device, and the LUN device is briefly referred to as a LUN in discussions below. A LUN has at least two types of identifiers having different functions, namely, a LUN ID and a universally unique identifier (Universally Unique Identifier, UUID). The LUN ID is an identifier of the LUN in the device, and is used to distinguish the LUN from other LUNs in the storage array. However, the LUN ID is unique only in the first storage array 20, and may coincide with a LUN ID of a LUN in another storage array (for example, the second storage array 30). The UUID is an identifier of the LUN, and the UUID is a globally unique number. In addition, it should be noted that after a LUN is attached to the host, the LUN visible to the host is a host LUN, and an identifier of the host LUN is referred to as a host LUN ID. The host LUN is not physical space that actually exists, but is a mapping of the LUN on the host. Therefore, the host LUN ID may also be considered as an identifier of the LUN. For the convenience of description, in this embodiment, a LUN identifier visible to the storage array is referred to as a device LUN ID, and a LUN identifier visible to the host is referred to as a host LUN ID. Unless otherwise particularly specified, an identifier of a LUN in the following is a host LUN ID of the LUN.

An address of a LUN is obtained by encapsulating a host LUN ID. As shown in FIG. 2, according to a SCSI standard, an address of a LUN includes eight octets. The first octet is a fixed value, for example, an address method (address method) and a bus identifier (bus identifier), the second octet is filled with an identifier of the LUN, and the remaining octets are padded with 0 or are null.

In actual application, a host normally runs a plurality of virtual machines, and one LUN in a storage array is allocated to one virtual machine on the host. In other words, each virtual machine corresponds to one LUN in the storage array. If 1000 virtual machines run on the host, the storage array needs to include 1000 LUNs to match the virtual machines. However, according to the SCSI standard, at most 256 or 512 LUNs can be mounted to a host. Obviously, a quantity of LUNs mounted to the host is limited. A proxy LUN is introduced to resolve the problem that the quantity of LUNs is limited. For the convenience of description, in this embodiment of the present invention, a LUN storing data is referred to as a level 2 LUN, and a LUN mounted to a host is referred to a level 1 LUN (or, a proxy LUN). A mapping relationship is established between one level 1 LUN and a plurality of level 2 LUNs. The level 1 LUN is mapped to a host LUN on the host, and a mapping relationship is established between the host LUN and a plurality of virtual machines. In actual application, a level 2 LUN may also be referred to as a VVOL LUN. It should be noted that a level 1 LUN does not actually store data, and data is stored in level 2 LUNs.

Figures 3, 4:
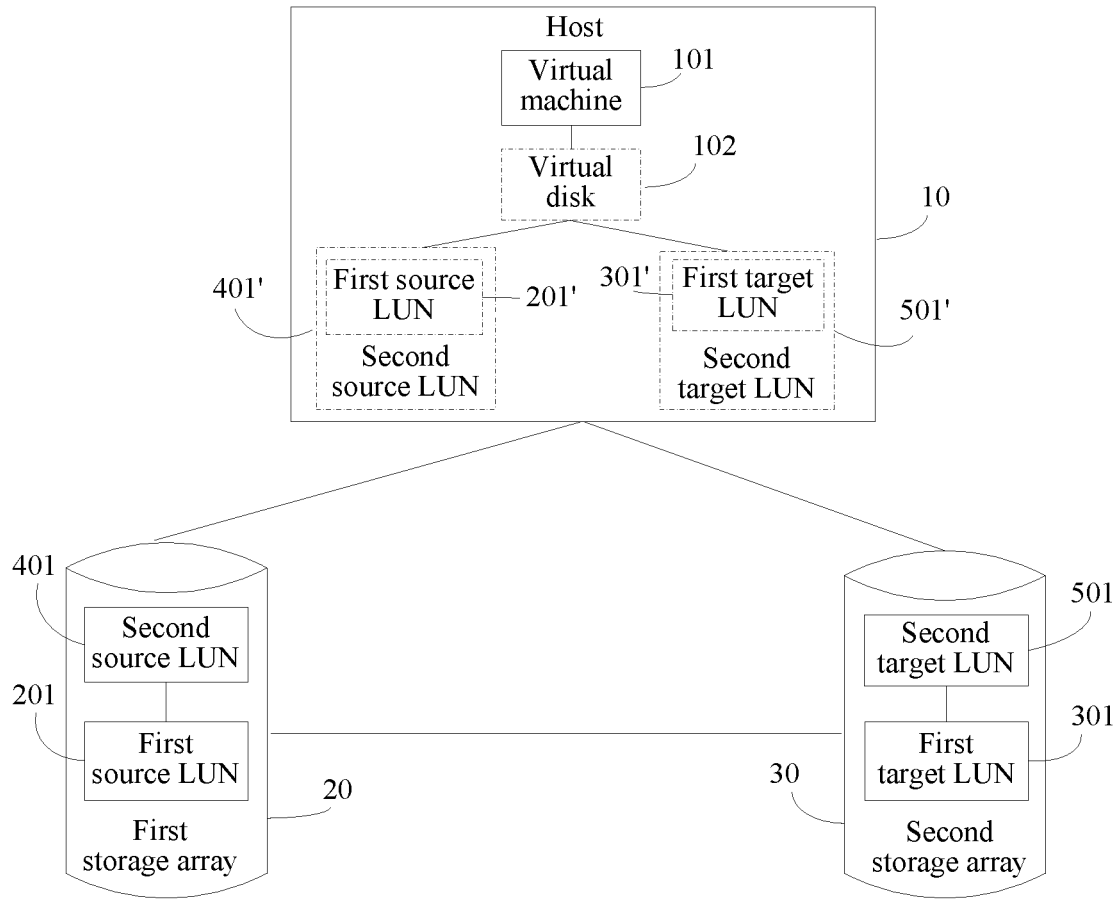
FIG. 3 is another system architecture diagram according to an embodiment of the present invention.
FIG. 4 is a schematic diagram of an address of a level 2 LUN according to an embodiment of the present invention.

Referring to FIG. 3, in a storage system shown in FIG. 3, a second source LUN 401 and a second target LUN 501 are level 1 LUNs. A host LUN by which the second source LUN 401 is mapped to the host 10 is a LUN 401', and a host LUN by which the second target LUN 501 is mapped to the host 10 is a LUN 501'. Assuming that multipathing software is installed on the host 10 shown in FIG. 3, the LUN 401' and the LUN 501' are mapped to a same virtual disk. Level 2 LUNs of the second source LUN 401 and the second target LUN 501 are a pair of active-active LUNs. The first source LUN 201 is the level 2 LUN of the second source LUN 401, and the first target LUN 301 is the level 2 LUN of the second target LUN 501. The first source LUN 201 and the first target LUN 301 are a pair of active-active LUNs, and UUIDs presented by the active-active LUNs to the host 10 are the same. It should be noted that although a UUID is a globally unique number of a LUN, an objective of active-active LUNs is to masquerade as one LUN to the host. Therefore, UUIDs presented by the active-active LUNs to the host are the same. In order that the UUIDs presented by the active-active LUNs to the host are the same, in this embodiment, one LUN in a pair of active-active LUNs may use a UUID of the other LUN as its UUID, and present the UUID to the host. A storage array in which the LUN is located stores a correspondence between an original UUID of the LUN and the UUID presented to the host. For example, a UUID of the first source LUN 201 is A, and a UUID of the first target LUN 301 is A'. UUIDs presented by the first source LUN 201 and the first target LUN 301 to the host 10 both are A', and the first storage array 20 stores a correspondence between A and A'.

The following describes mounting of a level 2 LUN. Mounting of a level 2 LUN includes two steps. Step 1. Mount a level 1 LUN in a storage array to a host, and after the level 1 LUN is mounted to the host, a SCSI channel between the host and the LUN is established. The host sends a data read command, a data write command, and another command to the LUN by using the SCSI channel. Step 2. Mount the level 2 LUN to the level 1 LUN. This embodiment focuses on describing step 2.

There is a management channel between a host and a storage array. The host sends a LUN create command and a LUN mounting command to the storage array by using the management channel, to instruct the storage array to create LUNs and mount a level 2 LUN to a level 1 LUN. Specifically, the host sends a level 2 LUN create command to the storage array by using the management channel, to instruct the storage array to create a level 2 LUN. In addition, the host further needs to send a level 2 LUN mounting command to the storage array by using the management channel, so that the LUN is mounted to a level 1 LUN. That the level 2 LUN is mounted to the level 1 LUN means that the level 2 LUN is bound to the level 1 LUN. After the level 2 LUN is mounted to the level 1 LUN, the host may access the level 2 LUN by using a SCSI channel. For example, the storage array 20 creates the first source LUN 201, and assigns a device LUN ID and the UUID to the first source LUN 201. The storage array 20 reports the device LUN ID of the first source LUN 201 to the host 10 by using the management channel. The host 10 sends a mounting command to the storage array 20 by using the management channel, and the mounting command includes a host ID and the device LUN ID that is of the first source LUN 201. The storage array 20 mounts the first source LUN 201 to a level 1 LUN (for example, the second source LUN 401 shown in FIG. 3) that has been created and has been mounted to the host 10, and sends an address of the first source LUN 201 to the host 10. In this embodiment, an address of a level 2 LUN includes an identifier of the level 2 LUN and an identifier of a level 1 LUN to which the level 2 LUN is mounted. For example, the address of the first source LUN 201 includes an identifier of the first source LUN 201 and an identifier of the second source LUN 401, and an address of the first target LUN 301 includes an identifier of the first target LUN 301 and an identifier of the second target LUN 501. A process of mounting the first target LUN 301 is similar to the process of mounting the first source LUN 201, and details are not described herein again. After the level 2 LUN has been mounted, the level 2 LUN is mapped to a sub LUN of the level 1 LUN on the host 10. For example, after the first source LUN 201 has been mounted, the first source LUN 201 is mapped to the first source LUN 201' of the second source LUN 401'. After the first target LUN 301 has been mounted, the first target LUN 301 is mapped to the first target LUN 301' of the second target LUN 501'.

For encapsulation of an address of a level 2 LUN, refer to FIG. 4. As shown in FIG. 4, the address of the level 2 LUN mainly includes two parts. The first part is an identifier of a level 1 LUN and the second part is an identifier of the level 2 LUN. In addition, some fixed values are further encapsulated into the address according to the SCSI standard. For example, as shown in FIG. 3, octet 0 and octet 2 both include an address method and a bus identifier.

When the virtual machine 101 needs to write data into a LUN, a user selects one virtual disk from a plurality of virtual disks, to receive data. Each level 2 LUN corresponds to one virtual disk. In this embodiment, using a virtual disk 102 as an example, a mapping relationship exists between a drive letter of the virtual disk 102 and the identifier of the first source LUN 201. Therefore, when the virtual disk 102 is selected, it is determined that the data is to be written into the first source LUN 201. The host 10 generates a data write command, and the data write command includes the data and the address of the first source LUN 201. The host 10 sends the data write command to the first storage array 20 by using the link A, and the first storage array 20 receives the data write command. According to the descriptions in FIG. 4, the address of the first source LUN 201 includes two parts, the first part is an identifier of the second source LUN 401', and the second part is the identifier of the first source LUN 201. Because the first storage array 20 stores the mapping relationship between the identifier of the second source LUN 401 and an identifier of the host LUN 401' of the second source LUN, the first storage array 20 may determine, based on the identifier of the second source LUN 401', that a to-be-accessed level 1 LUN is the second source LUN 401. Then, the first storage array 20 determines, based on the identifier of the first source LUN 201, that a to-be-accessed level 2 LUN is the first source LUN 201. Therefore, the data is written into the first source LUN 201.

After the active-active mechanism is adopted, a virtual machine is unaware of a link fault. If the link A is faulty, the host 10 switches to the link B by using the multipathing software. The host 10 sends the data write command to the second storage array 30 by using the link B. Theoretically, the first target LUN 301 and the first source LUN 201 are a pair of active-active LUNs. If the data can be written into the first target LUN 301, and the data is then copied from the first target LUN 301 to the first source LUN 201 after the link A is recovered, so that data consistency can be ensured. However, in actual application, an identifier of the first target LUN 301 may be different from an identifier of the first source LUN 201, and the second storage array 30 does not recognize the identifier of the first source LUN 201 after receiving the data write command. In this case, the data may be written into another level 2 LUN in the second storage array 30, leading to data inconsistency.

In this embodiment, an apparatus that selects a common valid address from an assignable-address set of a level 2 LUN reported by the first storage array 20 and an assignable-address set of a level 2 LUN reported by the second storage array 30 is referred to as an address assignment apparatus. The address assignment apparatus may be integrated into the host 10, or may be used as an independent server, or may be integrated into a storage array.

Figure 5:
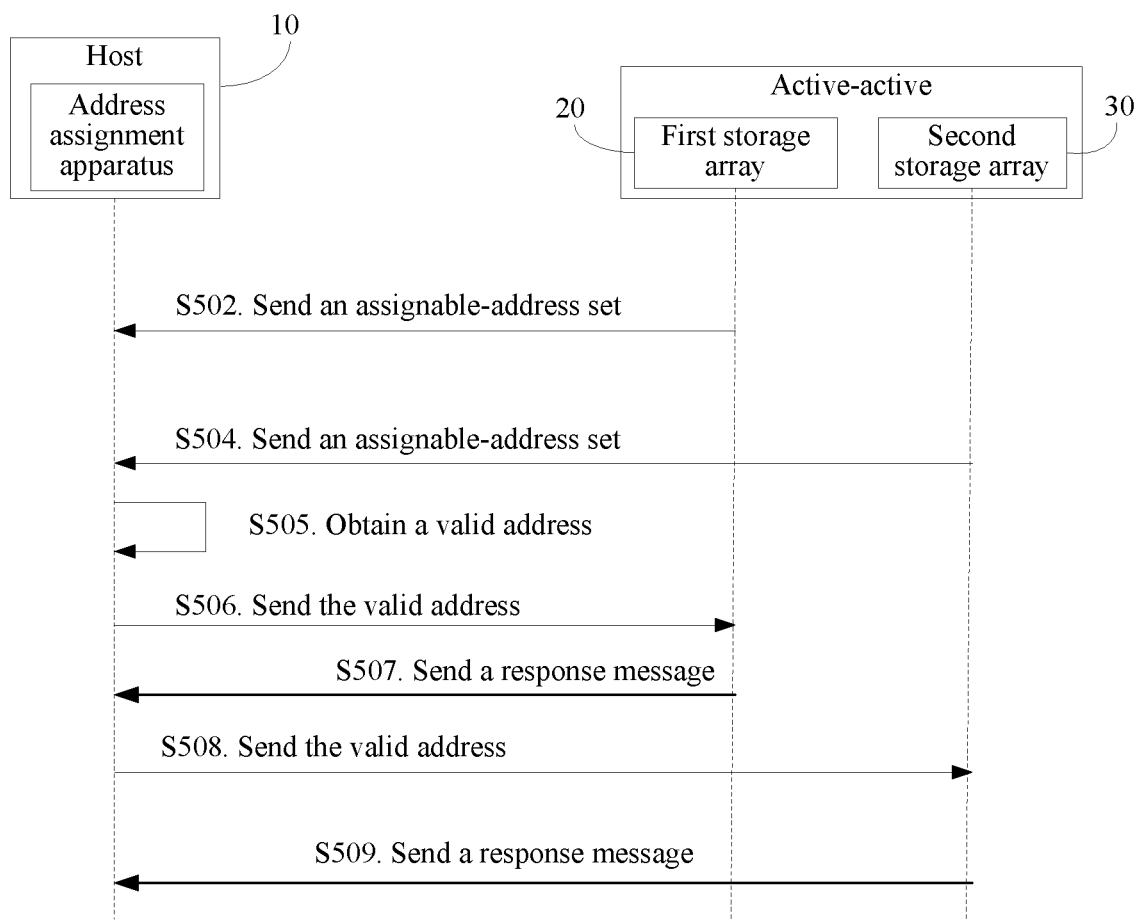
FIG. 5 is a signaling interaction diagram of an address assignment method according to an embodiment of the present invention.

When the address assignment apparatus is integrated into the host 10, an embodiment of the present invention provides an address assignment method, so that address consistency between active-active LUNs can be ensured in a process of mounting the active-active LUNs. Referring to FIG. 5, FIG. 5 is a signaling interaction diagram of the address assignment method according to this embodiment of the present invention. The method is applied to the active-active storage system shown in FIG. 3. As shown in FIG. 5, the method includes the following steps.

S502. The first storage array 20 sends an assignable-address set of a first source LUN to the host 10. The assignable-address set includes a plurality of assignable addresses of the first source LUN. The first source LUN is a level 2 LUN, for which reference is made to the first source LUN 201 shown in FIG. 3.

Herein, the sending an assignable-address set of a first source LUN to the host 10 specifically means sending the assignable-address set to the address assignment apparatus in the host 10. In addition, a VASA component is installed on the host 10, the VASA component is configured to instruct a storage array to mount a level 2 LUN to the host, and the host 10 sends an instruction to the first storage array 20 or the second storage array 30 by using the VASA component, to request mounting of a level 2 LUN. The address assignment apparatus in the host 10 may send a first address query command to the first storage array 20, and the command is used to query the assignable addresses of the first source LUN 201. Specifically, the host 10 sends the first address query command to the first storage array 20. In addition, this embodiment does not limit that the first storage array 20 cannot send the assignable-address set of the first source LUN to the host only until receiving the first address query command. When the first storage array 20 has not received the first address query command, the first storage array 20 may alternatively actively report the assignable-address set of the first source LUN to the address assignment apparatus in the host 10. For example, before receiving the first address query command, the first storage array 20 has selected a level 1 LUN that has been successfully created and has been mounted to the host 10, for example, the second source LUN 401 shown in FIG. 3. After generating an address of the first source LUN, the first storage array 20 may send the address of the first source LUN to the host 10. Based on the foregoing description, the address of the first source LUN 201 includes the identifier of the second source LUN 401 to which the first source LUN 201 is mounted and the identifier of the first source LUN 201. The identifier herein is a host LUN ID. The first source LUN 201 may have a plurality of assignable host LUN IDs according to a preset host LUN ID assignment manner of a storage system. Therefore, the assignable-address set of the first source LUN 201 may include a plurality of assignable addresses. An assignable address is an address used by the host to access a level 2 LUN, and includes a host LUN ID of the level 2 LUN and a host LUN ID of a level 1 LUN to which the level 2 LUN is mounted. For example, the assignable address of the first source LUN 201 includes the host LUN ID of the first source LUN 201 and the host LUN ID of the second source LUN 401. In the plurality of assignable addresses included in the assignable-address set, the host LUN IDs of the second source LUN 401 in the assignable addresses are the same. It should be noted that in this embodiment of the present invention, the assignable-address set may be in a form of a table, or may be in a form of a bitmap or another form provided that the assignable-address set can include the plurality of assignable addresses.

S504. The second storage array 30 sends an assignable-address set of a first target LUN to the host 10. Similarly, the sending an assignable-address set of a first target LUN to the host 10 means sending the assignable-address set of the first target LUN to the address assignment apparatus in the host 10. The assignable-address set includes a plurality of assignable addresses of the first target LUN. The first target LUN is a level 2 LUN, for which reference is made to the first target LUN 301 shown in FIG. 3. Similar to the first source LUN 201, the first target LUN also has a plurality of assignable addresses, and each assignable address includes one assignable host LUN ID. In addition, each assignable address further includes a host LUN ID of the second target LUN 501, the host LUN ID of the second target LUN 501 included in each assignable address is definite, and the host LUN ID of the second target LUN 501 and the host LUN ID of the second source LUN 401 are the same.

S505. The address assignment apparatus in the host 10 obtains a valid address from the assignable-address set of the first source LUN 201 and the assignable-address set of the first target LUN 301. The valid address is one assignable address in an intersection of the assignable-address set of the first source LUN 201 and the assignable-address set of the first target LUN 301. The plurality of assignable addresses of the first source LUN 201 are different mainly because the included assignable host LUN IDs of the first source LUN 201 are different. Therefore, step S505 may also be understood as obtaining a common host LUN ID from the plurality of assignable host LUN IDs of the first source LUN 201 and the plurality of assignable host LUN IDs of the first target LUN 301, and then encapsulating the common host LUN ID into the valid address. For example, if the plurality of assignable host LUN IDs of the first source LUN 201 are [1-100], and the plurality of assignable host LUN IDs of the first target LUN 301 are [50-100], the common host LUN IDs are [50-100]. The host 10 may obtain any ID from [50-100], and encapsulate the ID into the valid address. A format of the valid address conforms to the SCSI standard, for which reference is made to the address format shown in FIG. 4.

S506. The host 10 sends the valid address to the first storage array 20. Specifically, the address assignment apparatus may send the valid address to the first storage array 20.

S507. The first storage array 20 sends a first response message to the host 10, to acknowledge that the valid address is an address of the first source LUN.

Optionally, the first storage array 20 may further bind the valid address to the first source LUN 201. The binding the valid address to the first source LUN 201 means that the first storage array 20 stores a mapping relationship between the valid address and a UUID of the first source LUN 201. The valid address is the address of the first source LUN 201. A host LUN ID of a level 2 LUN included in octets 2 to 5 of the valid address is the host LUN ID shared by the first source LUN 201 and the first target LUN 301. After binding the valid address to the first source LUN, the first storage array 20 may send the address of the first source LUN 201 to the host 10 when the host 10 initiates hardware scanning. It should be noted that the UUID of the first source LUN 201 bound to the valid address may be the UUID (for example, A) of the first source LUN 201 itself, or may be a UUID (for example, A') presented to the host 10. Because the first storage array 20 stores a correspondence between A and A', regardless of which UUID the valid address is bound to, the first storage array 20 can find the UUID of the first source LUN 201 by using the valid address, to access the first source LUN 201.

S508. The host 10 sends the valid address to the second storage array 30.

S509. The second storage array 30 sends a second response message to the host 10, to acknowledge that the valid address is an address of the first target LUN.

Optionally, the second storage array 30 may further bind the valid address to the first target LUN 301. The binding the valid address to the first target LUN 301 means that the first storage array 30 stores a mapping relationship between the valid address and a UUID of the first target LUN 301. The valid address is the address of the first target LUN 301. A host LUN ID of a level 2 LUN included in octets 2 to 5 of the valid address is the host LUN ID shared by the first source LUN 201 and the first target LUN 301. After binding the valid address to the first target LUN, the second storage array 30 may send the address of the first target LUN 301 to the host 10 when the host 10 initiates hardware scanning.

It is mentioned in step S504 that the host LUN ID of the second target LUN 501 and the host LUN ID of the second source LUN 401 are the same. The following describes how to ensure consistency between host LUN IDs of level 1 LUNs to which level 2 LUNs are mounted.

After the level 1 LUN (for example, the second source LUN 401) in the first storage array 20 and the level 1 LUN (for example, the second target LUN 501) in the second storage array 30 are mounted to the host 10, the host 10 separately performs hardware device scanning for the first storage array 20 and the second storage array 30. The first storage array 20 sends an address of the second source LUN 401 to the address assignment apparatus in the host 10. The address of the second source LUN 401 includes the identifier of the second source LUN 401. The second storage array 30 sends an address of the second target LUN 501 to the host 10. The address of the second target LUN 501 includes the identifier of the second target LUN 501. The address assignment apparatus in the host 10 determines whether the address of the second source LUN 401 and the address of the second target LUN 501 are the same. In other words, the address assignment apparatus determines whether the host LUN ID of the second source LUN 401 and the host LUN ID of the second target LUN 501 are the same. If the host LUN IDs are different, the address assignment apparatus in the host 10 sends a query instruction to the first storage array 20. The query instruction is used to query assignable addresses of the second source LUN 401. The first storage array 20 feeds back an assignable-address set of the second source LUN 401 to the address assignment apparatus in the host 10. The assignable-address set includes the plurality of assignable addresses, and each assignable address includes one assignable host LUN ID. Similarly, the address assignment apparatus in the host 10 sends a query instruction to the second storage array 30. The query instruction is used to query assignable addresses of the second target LUN 501. The second storage array 30 feeds back an assignable-address set of the second target LUN 501 to the address assignment apparatus in the host 10. The assignable-address set includes the plurality of assignable addresses, and each assignable address includes one assignable host LUN ID. The address assignment apparatus in the host 10 obtains, from the two assignable-address sets, a same address as the valid address after receiving the assignable-address sets sent by the two storage arrays. If there are a plurality of valid addresses, the host 10 selects any one of the plurality of valid addresses, and separately sends the valid address to the first storage array 20 and the second storage array 30. After receiving the valid address, the first storage array 20 sends a response message to the host, to acknowledge that the valid address is the address of the second source LUN 401. In addition, the first storage array 20 may bind the valid address to a UUID of the second source LUN 401. After receiving the valid address, the second storage array 30 sends a response message to the host, to acknowledge that the valid address is the address of the second target LUN 501. In addition, the second storage array 30 may bind the valid address to a UUID of the second target LUN 501. The first storage array 20 and the second storage array 30 separately feed back the valid address to the host 10 when the host 10 performs hardware device scanning for the first storage array 20 and the second storage array 30 again.

Figure 6:
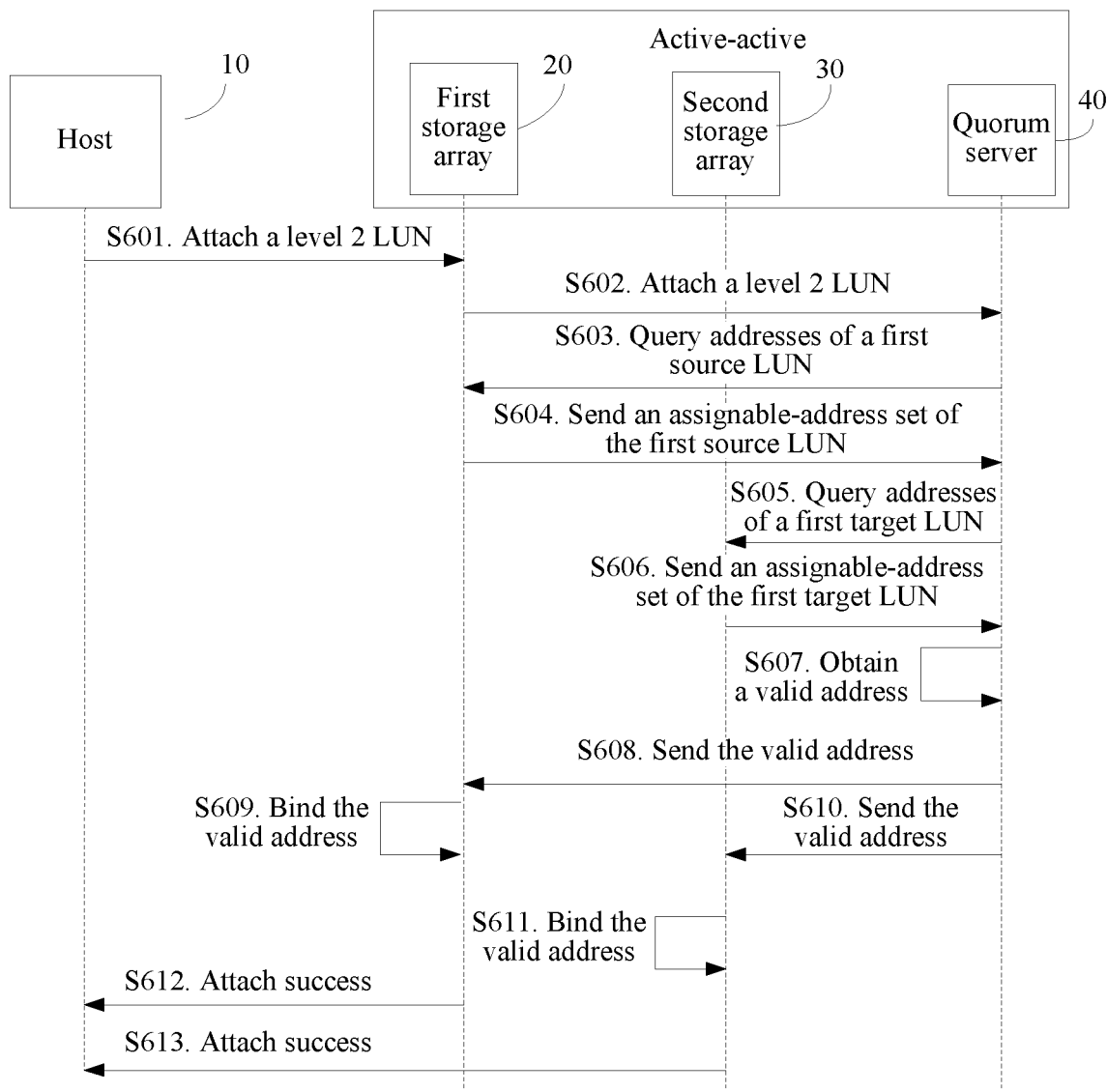
FIG. 6 is a signaling interaction diagram of another address assignment method according to an embodiment of the present invention.

In addition, the address assignment apparatus described above may alternatively be located in an independent quorum server 40. When the address assignment apparatus is located in the quorum server 40, an embodiment further provides another address assignment method. Referring to FIG. 6, FIG. 6 is a signaling interaction diagram of the another address assignment method. As shown in FIG. 6, the method includes the following steps:

S601. The host 10 instructs, by using a VASA component, the first storage array 20 to mount a level 2 LUN. The first source LUN 201 and the first target LUN 301 shown in FIG. 3 are still used as examples of level 2 LUNs herein. The first source LUN 201 and the first target LUN 301 are a pair of active-active LUNs. The host 10 may further send a mounting command to the second storage array 30.

S602. The first storage array 20 notifies the address assignment apparatus in the quorum server 40 that the host requires mounting of the level 2 LUN.

S603. The address assignment apparatus in the quorum server 40 sends a first address query command to the first storage array 20, to request to query assignable addresses of the first source LUN 201.

S604. The first storage array 20 sends an assignable-address set of the first source LUN 201 to the address assignment apparatus in the quorum server 40. Before receiving the first address query command, the first storage array 20 has selected a level 1 LUN that has been successfully created and has been mounted to the host 10, for example, the second source LUN 401 shown in FIG. 3. Based on the foregoing description, an address of the first source LUN 201 includes a host LUN ID of the second source LUN 301 to which the first source LUN 201 is mounted and a host LUN ID of the first source LUN 201. The first source LUN 201 may have a plurality of assignable host LUN IDs according to a preset host LUN ID assignment manner of a storage system. Therefore, the assignable-address set of the first source LUN 201 may include a plurality of assignable addresses, and each assignable address includes one assignable host LUN ID. In addition, each assignable address further includes the host LUN ID of the second source LUN 401, and the host LUN ID of the second source LUN 401 included in each assignable address is definite. It should be noted that in this embodiment of the present invention, the assignable-address set may be in a form of a table, or may be in a form of a bitmap or another form provided that the assignable-address set can include the plurality of assignable addresses.

S605. The address assignment apparatus in the quorum server 40 sends a second address query command to the second storage array 30, to request to query assignable addresses of the first target LUN 301.

S606. The second storage array 30 sends an assignable-address set of the first target LUN 301 to the address assignment apparatus in the quorum server 40. The assignable-address set includes a plurality of assignable addresses of the first target LUN. Similar to the first source LUN 201, the first target LUN also has a plurality of assignable addresses, and each assignable address includes one assignable host LUN ID. In addition, each assignable address further includes a host LUN ID of the second target LUN 501, the host LUN ID of the second target LUN 501 included in each assignable address is definite, and the host LUN ID of the second target LUN 501 and the host LUN ID of the second source LUN 401 are the same. It should be noted that the first storage array 20 and the second storage array 30 may alternatively actively report assignable-address sets of level 1 LUNs to the quorum server 40, but does not report the assignable-address sets after receiving query requests of the quorum server 40.

S607. The address assignment apparatus in the quorum server 40 obtains at least one valid address from the assignable-address set of the first source LUN 201 and the assignable-address set of the first target LUN 301. The valid address is a subset of the plurality of assignable addresses of the first source LUN 201, and the valid address is also a subset of the plurality of assignable addresses of the first target LUN 301. In other words, the valid address is an intersection of the plurality of assignable addresses of the first source LUN 201 and the plurality of assignable addresses of the first target LUN 301. The plurality of assignable addresses of the first source LUN 201 are different mainly because the included assignable host LUN IDs of the first source LUN 201 are different. Therefore, step S607 may also be understood as obtaining a common host LUN ID from the plurality of assignable host LUN IDs of the first source LUN 201 and the plurality of assignable host LUN IDs of the first target LUN 301, and then encapsulating the common host LUN ID into the valid address. For example, if the plurality of assignable host LUN IDs of the first source LUN 201 are [1-100], and the plurality of assignable host LUN IDs of the first target LUN 301 are [50-100], the common host LUN IDs are [50-100]. The host 10 may obtain any ID from [50-100], and encapsulate the ID into the valid address. A format of the valid address conforms to the SCSI standard, for which reference is made to the address format shown in FIG. 4.

S608. The address assignment apparatus in the quorum server 40 sends the valid address to the first storage array 20.

S609. The first storage array 20 may further bind the valid address to the first source LUN 201. Specifically, the first storage array 20 stores a mapping relationship between the valid address and a UUID of the first source LUN 201. Therefore, the valid address is the address of the first source LUN 201. A host LUN ID of a level 2 LUN included in octets 2 to 5 of the valid address is the host LUN ID of the first source LUN 201.

S610. The address assignment apparatus in the quorum server 40 sends the valid address to the second storage array 30. This step and step S608 are not performed in a particular order.

S611. The second storage array 30 may further bind the valid address to the first target LUN 301. Specifically, the second storage array 30 stores a mapping relationship between the valid address and a UUID of the first target LUN 301. Therefore, the valid address is an address of the first target LUN 301. A host LUN ID of a level 2 LUN included in octets 2 to 5 of the valid address is the host LUN ID of the first target LUN 301.

S612. The first storage array 20 feeds back a mounting success to the host 10, and sends the address of the first source LUN 201 to the host 10. Specifically, the first storage array 20 may send a message to the host 10, and the message includes the valid address, to acknowledge that the valid address is the address of the first source LUN 201. The host 10 can acknowledge an identity of the first source LUN 201 and subsequently access the first source LUN 201 by using the address only after the first storage array 20 feeds back the mounting success to the host 10 and sends the address of the first source LUN 201 to the host 10. It should be noted that step S609 is an optional step. The valid address can come into effect provided that the first storage array 20 feeds back the mounting success to the host 10 and sends the address of the first source LUN 201 to the host 10. The first storage array 20 stores the mapping relationship between the valid address and the UUID of the first source LUN 201, so that the first storage array 20 can find the first source LUN 201 based on the mapping relationship when the host 10 subsequently accesses the first source LUN 201 by using the valid address.

S613. The second storage array 30 feeds back a mounting success to the host 10, and sends the address of the first target LUN 301 to the host 10. Specifically, the second storage array 30 may send a message to the host 10, and the message includes the valid address, to acknowledge that the valid address is the address of the first target LUN 301. The host 10 can acknowledge an identity of the first target LUN 301 and subsequently access the first target LUN 301 by using the address only after the second storage array 30 feeds back the mounting success to the host 10 and sends the address of the first target LUN 301 to the host 10. It should be noted that step S611 is an optional step. The valid address can come into effect provided that the second storage array 30 feeds back the mounting success to the host 10 and sends the address of the first target LUN 301 to the host 10. The second storage array 30 stores the mapping relationship between the valid address and the UUID of the first target LUN 301, so that the second storage array 30 can find the first target LUN 301 based on the mapping relationship when the host 10 subsequently accesses the first target LUN 301 by using the valid address.

Correspondingly, in the implementation shown in FIG. 6, an operation of ensuring that an address of the second source LUN 401 and an address of the second target LUN 501 are the same is also implemented by the quorum server 40. Specifically, after the level 1 LUN (for example, the second source LUN 401) in the first storage array 20 and the level 1 LUN (for example, the second target LUN 501) in the second storage array 30 are mounted to the host 10, the host 10 separately performs hardware device scanning for the first storage array 20 and the second storage array 30. The first storage array 20 reports, to the quorum server 40, an event that the host initiates hardware device scanning. The address assignment apparatus in the quorum server 40 respectively sends address query instructions to the first storage array 20 and the second storage array 30, to query the address of the second source LUN 401 and the address of the second target LUN 501. If the address of the second source LUN 401 and the address of the second target LUN 501 are different, the address assignment apparatus in the quorum server 40 further sends a query instruction to the first storage array 20, and the query instruction is used to query assignable addresses of the second source LUN 401. The first storage array 20 feeds back an assignable-address set of the second source LUN 401 to the address assignment apparatus in the quorum server 40. The assignable-address set includes a plurality of assignable addresses, and each assignable address includes one assignable host LUN ID. Similarly, the address assignment apparatus in the quorum server 40 sends a query instruction to the second storage array 30, and the query instruction is used to query assignable addresses of the second target LUN 501. The second storage array 30 feeds back an assignable-address set of the second target LUN 501 to the address assignment apparatus in the quorum server 40. The assignable-address set includes a plurality of assignable addresses, and each assignable address includes one assignable host LUN ID. The address assignment apparatus in the quorum server 40 obtains, from the two assignable-address sets, a same address as the valid address after receiving the assignable-address sets sent by the two storage arrays. If there are a plurality of valid addresses, the quorum server 40 selects any one of the plurality of valid addresses, and separately sends the valid address to the first storage array 20 and the second storage array 30. After receiving the valid address, the first storage array 20 sends the valid address to the host 10, to acknowledge that the valid address is an address of the second source LUN 401. In addition, the first storage array 20 may bind the valid address to a UUID of the second source LUN 401. After receiving the valid address, the second storage array 30 sends the valid address to the host 10, to acknowledge that the valid address is an address of the second target LUN 501. In addition, the second storage array 30 may bind the valid address to a UUID of the second target LUN 501.

Figure 7:
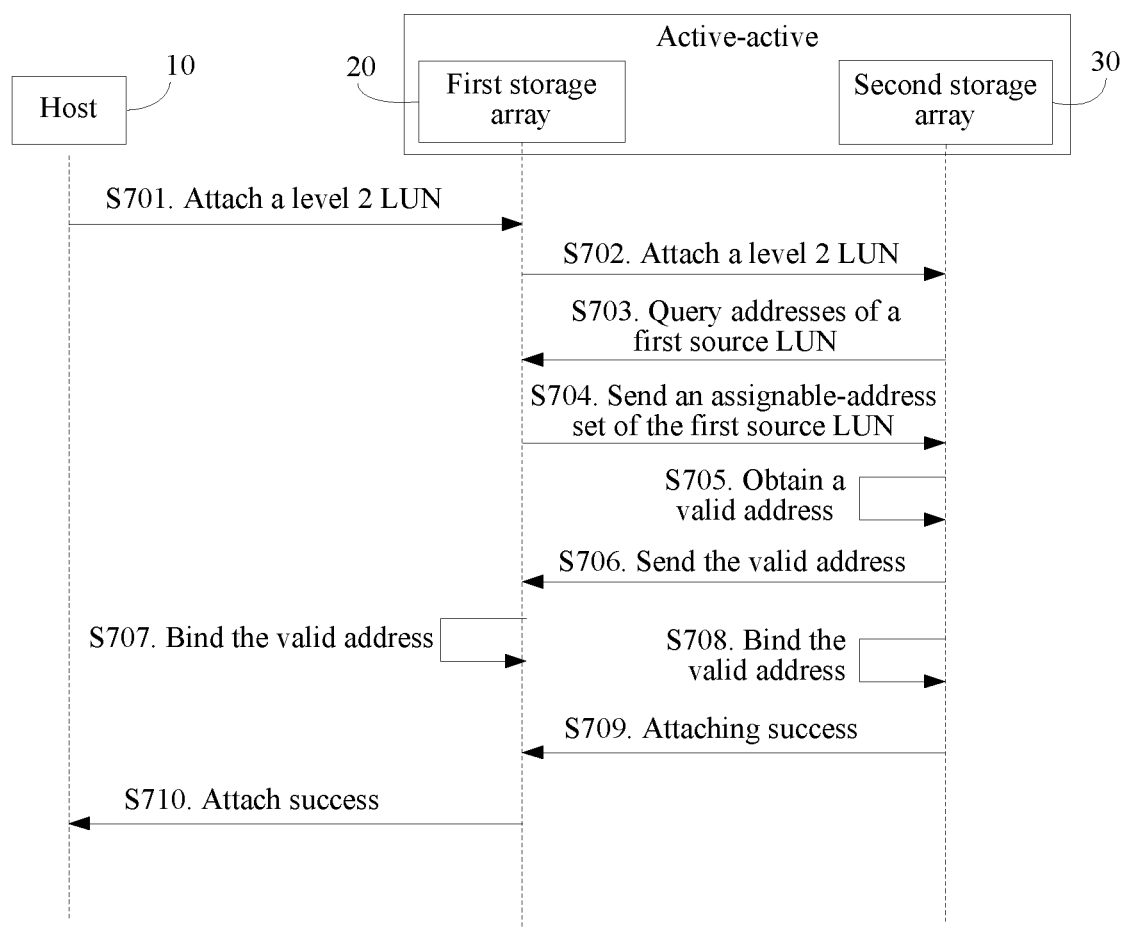
FIG. 7 is a signaling interaction diagram of still another address assignment method according to an embodiment of the present invention.

In addition, the address assignment apparatus described above may alternatively be integrated in either of the first storage array 20 and the second storage array 30. Assuming that the address assignment apparatus is located in the second storage array 30, an embodiment further provides another address assignment method. Referring to FIG. 7, FIG. 7 is a signaling interaction diagram of the another address assignment method. As shown in FIG. 7, the method includes the following steps.

S701. The host 10 instructs, by using a VASA component, the first storage array 20 to mount a level 2 LUN. The first source LUN 201 and the first target LUN 301 shown in FIG. 3 are still used as examples of level 2 LUNs herein. The first source LUN 201 and the first target LUN 301 are a pair of active-active LUNs.

S702. The first storage array 20 notifies the second storage array 30 of a level 2 LUN mounting event.

It may be understood that the host 10 may further instruct the second storage array 30 to mount a level 2 LUN, or instruct at the same time the first storage array 20 and the second storage array 30 to mount level 2 LUNs. After receiving the notification, a storage array that does not include an address assignment apparatus needs to notify the level 2 LUN mounting event to a storage array that includes an address assignment apparatus.

S703. The address assignment apparatus in the second storage array 3 sends a first address query command to the first storage array 20, to request to query assignable addresses of a first source LUN 201.

S704. The first storage array 20 sends an assignable-address set of the first source LUN 201 to the address assignment apparatus in the second storage array 30. For specific content of this step, refer to step S502 shown in FIG. 5 and step S604 shown in FIG. 6, and details are not described herein again.

S705. The second storage array 30 obtains a valid address. Specifically, the address assignment apparatus in the second storage array 30 obtains the valid address based on the assignable-address set of the first source LUN 201 and an assignable-address set of the local first target LUN 301. The valid address herein is the same as that in step S505 shown in FIG. 5 and step S607 shown in FIG. 6.

S706. The address assignment apparatus in the second storage array 30 sends the valid address to the first storage array 20.

S707. The second storage array 30 feeds back a mounting success to the first storage array 20, and sends the address of the first target LUN 301 to the first storage array 20.

S708. The first storage array 20 feeds back the mounting success to the host 10, and sends the address of the first source LUN 201 and the address of the first target LUN 301 to the host 10.

In addition, after the valid address comes into effect, the first storage array 20 may further bind the valid address to the first source LUN 201. Specifically, the first storage array 20 stores a mapping relationship between the valid address and a UUID of the first source LUN 201. The valid address is the address of the first source LUN 201. A host LUN ID of a level 2 LUN included in octets 2 to 5 of the valid address is a host LUN ID of the first source LUN 201. Similarly, the second storage array 30 may further bind the valid address to the first target LUN 301.

Because the address assignment apparatus is located in the second storage array 30, an operation of ensuring that an address of a second source LUN 401 and an address of the second target LUN 501 are the same is also implemented by the second storage array 30. Specifically, after a level 1 LUN (for example, the second source LUN 401) in the first storage array 20 and a level 1 LUN (for example, the second target LUN 501) in the second storage array 30 are mounted to the host 10, the host 10 separately performs hardware device scanning for the first storage array 20 and the second storage array 30. The address assignment apparatus in the second storage array 30 sends an address query instruction to the first storage array 20, to query the address of the second source LUN 401. If the address of the second source LUN 401 and the address of the second target LUN 501 are different, the address assignment apparatus in the second storage array 30 further sends a query instruction to the first storage array 20, and the query instruction is used to query assignable addresses of the second source LUN 401. The first storage array 20 feeds back an assignable-address set of the second source LUN 401 to the address assignment apparatus in the second storage array 30. The assignable-address set includes the plurality of assignable addresses, and each assignable address includes one assignable host LUN ID. The second storage array 30 locally stores an assignable-address set of the second target LUN 501. The assignable-address set includes a plurality of assignable addresses, and each assignable address includes one assignable host LUN ID. The address assignment apparatus in the second storage array 30 obtains, from the two assignable-address sets, a same address as a valid address. If there are a plurality of valid addresses, the second storage array 30 selects any one of the plurality of valid addresses, and sends the valid address to the first storage array 20. After receiving the valid address, the first storage array 20 sends the valid address to the host 10, to acknowledge that the valid address is the address of the second source LUN 401. In addition, the first storage array 20 may bind the valid address to a UUID of the second source LUN 401. The second storage array 30 sends the valid address to the host 10, to acknowledge that the valid address is the address of the second target LUN 501. In addition, the second storage array 30 may bind the valid address to a UUID of the second target LUN 501.

In the implementation shown in FIG. 5, FIG. 6, or FIG. 7, the first storage array 20 and the second storage array 30 separately send the assignable-address sets of the level 2 LUNs to the address assignment apparatus. The address assignment apparatus may be integrated into the host 10, the quorum server 40, or the second storage array 30. The address assignment apparatus obtains, from the assignable-address sets of the two level 2 LUNs, the valid address shared by the two LUNs, and then, separately sends the valid address to the first storage array 20 and the second storage array 30, thereby implementing address consistency between the first source LUN 201 and the first target LUN 301. When a fault occurs on the link A, the host 10 switches to the link B by using multipathing software. The host 10 sends, to the second storage array 30 by using the link B, a data write command that is originally destined to the first storage array 20. Because the address of the first target LUN 301 and the address of the first source LUN are the same, the second storage array 30 can find the first target LUN 301 based on the address, and write data carried in the data write command into the first target LUN 301. Because the first target LUN 301 and the first source LUN 201 are a pair of active-active LUNs, when the fault is rectified, the second storage array 30 can copy the data into the first source LUN, thereby ensuring data consistency between the active-active LUNs.

In addition, in the implementation shown in any one of FIG. 5, FIG. 6, and FIG. 7, address consistency between level 2 LUNs is implemented in a process of mounting the level 2 LUNs to a level 1 LUN. However, the embodiments of the present invention are not limited to the foregoing implementation. For example, address consistency between the level 2 LUNs may be implemented after the level 2 LUNs are successfully mounted to a level 1 LUN. Specifically, the first storage array 20 reports the address of the first source LUN 201 to the address assignment apparatus, and the second storage array 30 reports the address of the first target LUN 301 to the address assignment apparatus. The address assignment apparatus determines whether the address of the first source LUN 201 and the address of the first target LUN 301 are the same, and when the addresses are different, the address assignment apparatus separately sends address query commands to the first storage array 20 and the second storage array 30. The first storage array 20 sends the assignable-address set of the first source LUN to the address assignment apparatus, and the second storage array 30 sends the assignable-address set of the first target LUN to the address assignment apparatus. The address assignment apparatus obtains the valid address from the assignable-address set of the first source LUN 201 and the assignable-address set of the first target LUN 301, and separately sends the valid address to the first storage array 20 and the second storage array 30. When the address assignment apparatus is located in the host 10, the process is performed by the host 10. If the address assignment apparatus is located in the quorum server 40, the process is performed by the quorum server 40. If the address assignment apparatus is located in any storage array, the process is performed by the storage array.

Figure 8:
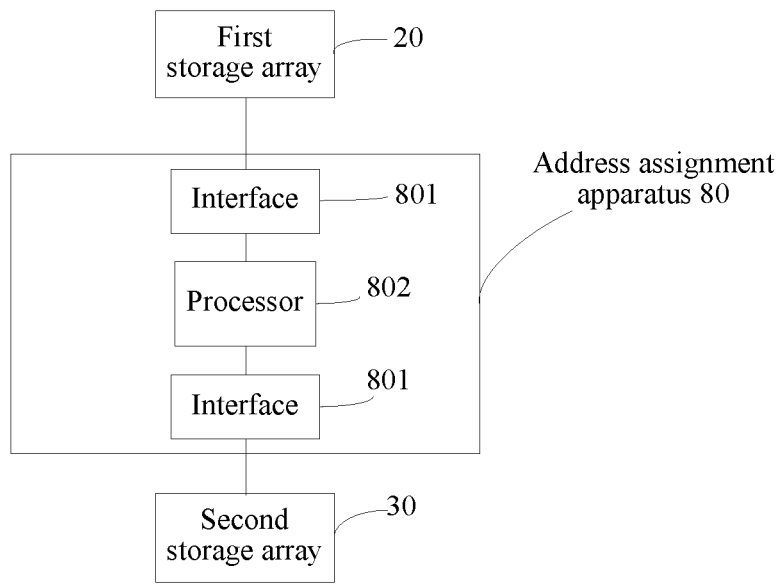
FIG. 8 is a schematic diagram of a hardware structure of an address assignment apparatus according to an embodiment of the present invention.
Figure 9:
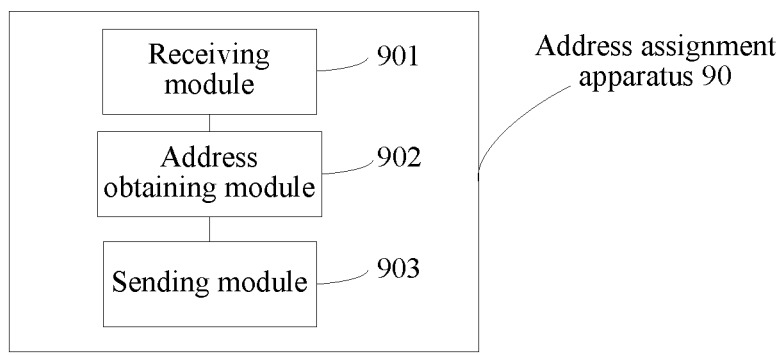
FIG. 9 is a schematic structural diagram of an address assignment apparatus according to an embodiment of the present invention.

As shown in FIG. 8, an address assignment apparatus 80 provided in an embodiment of the present invention includes at least an interface 801 and a processor 802. The interface 801 is configured to communicate with a first storage array 20, and communicate with a second storage array 30. The first storage array includes a first source logical unit number LUN, the second storage array includes a first target LUN, and the first source LUN and the first target LUN are a pair of active-active LUNs. The processor 802 may be a central processing unit (CPU), or may be a field-programmable gate array (FPGA). In addition, the address assignment apparatus 80 may further include a memory. The memory includes a volatile memory, a non-volatile memory, or a combination thereof. The volatile memory is, for example, a random access memory (RAM). The non-volatile memory is any machine-readable medium that can store program code, for example, a floppy disk, a hard disk, a solid state disk (SSD), or an optical disc. When the processor 802 is a CPU, the processor 802 may run the program code in the memory, to perform the following functions. When the processor 802 is an FPGA, the processor may independently perform the following functions. It should be noted that the address assignment apparatus 80 may be the address assignment apparatus in any implementation shown in FIG. 5, FIG. 6, and FIG. 7.

For example, the processor 802 receives, by using the interface 801, an assignable-address set of a first source LUN sent by the first storage array 20, where the assignable-address set of the first source LUN includes a plurality of assignable addresses of the first source LUN; receives, by using the interface 801, an assignable-address set of a first target LUN sent by the second storage array 30, where the assignable-address set of the first target LUN includes a plurality of assignable addresses of the first target LUN; obtains a valid address from the assignable-address set of the first source LUN and the assignable-address set of the first target LUN, where the valid address is one assignable address in an intersection of the plurality of assignable addresses of the first source LUN and the plurality of assignable addresses of the first target LUN; and sends the valid address to the first storage array 20 and sends the valid address to the second storage array 30.

Optionally, the processor 802 is further configured to send a first address query command to the first storage array 20, where the first address query command is used to query the assignable addresses of the first source LUN, so that the first storage array 20 sends the assignable-address set of the first source LUN to the processor in response to the first address query command. The processor 802 is further configured to send a second address query command to the second storage array 30, where the second address query command is used to query the assignable addresses of the first target LUN, so that the second storage array 30 sends the assignable-address set of the first target LUN to the processor in response to the second address query command.

Optionally, the first storage array 20 further includes a second source LUN, the second storage array 30 further includes a second target LUN, and the second source LUN and the second target LUN are a pair of active-active LUNs. The first source LUN is mounted to the second source LUN, each assignable address of the first source LUN includes a host LUN ID of the second source LUN and a host LUN ID of the first source LUN. The first target LUN is mounted to the second target LUN, and each assignable address of the first target LUN includes a host LUN ID of the second target LUN and a host LUN ID of the first target LUN.

Optionally, the host LUN ID of the second source LUN and the host LUN ID of the second target LUN are the same.

Optionally, the processor 802 is further configured to: receive, by using the interface, an assignable-address set of the second source LUN sent by the first storage array, where the assignable-address set of the second source LUN includes a plurality of assignable addresses of the second source LUN, and each assignable address includes one assignable host LUN ID of the second source LUN; receive, by using the interface, an assignable-address set of the second target LUN sent by the second storage array, where the assignable-address set of the second target LUN includes a plurality of assignable addresses of the second target LUN, and each assignable address includes one assignable host LUN ID of the second target LUN; obtain a valid address of a level 1 LUN from the assignable-address set of the second source LUN and the assignable-address set of the second target LUN, where the valid address of a level 1 LUN is one assignable address in an intersection of the plurality of assignable addresses of the second source LUN and the plurality of assignable addresses of the second target LUN, and the valid address includes the host LUN ID of the second source LUN; and send the valid address of a level 1 LUN to the first storage array and send the valid address of a level 1 LUN to the second storage array.

The address assignment apparatus 80 may be integrated into the host 10, or used as an independent server (for example, the quorum server 40 shown in FIG. 6), or integrated into the second storage array 30. Therefore, for the functions of the processor 802, refer to the embodiments shown in FIG. 5, FIG. 6, and FIG. 7, and details are not described herein again.

An embodiment of the present invention further provides an address assignment apparatus 90. The address assignment apparatus 90 is located in an active-active storage system. The active-active storage system includes a first storage array 20, a second storage array 30, and the address assignment apparatus 90. The first storage array 20 includes a first source LUN, and the second storage array 30 includes a first target LUN. The first source LUN and the first target LUN are a pair of active-active LUNs. Specifically, the address assignment apparatus 90 includes a receiving module 901, an address obtaining module 902, and a sending module 903. It should be noted that the address assignment apparatus 90 may be the address assignment apparatus in any implementation shown in FIG. 5, FIG. 6, and FIG. 7.

The receiving module 901 is configured to receive an assignable-address set of the first source LUN sent by the first storage array 20, where the assignable-address set of the first source LUN includes a plurality of assignable addresses of the first source LUN; and further configured to receive an assignable-address set of the first target LUN sent by the second storage array 30, where the assignable-address set of the first target LUN includes a plurality of assignable addresses of the first target LUN. The address obtaining module 902 is configured to obtain a valid address from the assignable-address set of the first source LUN and the assignable-address set of the first target LUN, where the valid address is one assignable address in an intersection of the plurality of assignable addresses of the first source LUN and the plurality of assignable addresses of the first target LUN. The sending module 903 is configured to send the valid address to the first storage array 20 and send the valid address to the second storage array 30.

Optionally, the sending module 903 is further configured to send a first address query command to the first storage array, where the first address query command is used to query the assignable addresses of the first source LUN, so that the first storage array sends the assignable-address set of the first source LUN to the receiving module 901 in response to the first address query command. The sending module 903 is further configured to send a second address query command to the second storage array, where the second address query command is used to query the assignable addresses of the first target LUN, so that the second storage array sends the assignable-address set of the first target LUN to the receiving module 901 in response to the second address query command.

Optionally, the first storage array further includes a second source LUN, the second storage array further includes a second target LUN, and the second source LUN and the second target LUN are a pair of active-active LUNs. The first source LUN is mounted to the second source LUN, each assignable address of the first source LUN includes a host LUN ID of the second source LUN and a host LUN ID of the first source LUN. The first target LUN is mounted to the second target LUN, and each assignable address of the first target LUN includes a host LUN ID of the second target LUN and a host LUN ID of the first target LUN.

Optionally, the host LUN ID of the second source LUN and the host LUN ID of the second target LUN are the same.

Optionally, the receiving module 901 is further configured to: receive an assignable-address set of the second source LUN sent by the first storage array, where the assignable-address set of the second source LUN includes a plurality of assignable addresses of the second source LUN, and each assignable address includes one assignable host LUN ID of the second source LUN; and receive an assignable-address set of the second target LUN sent by the second storage array, where the assignable-address set of the second target LUN includes a plurality of assignable addresses of the second target LUN, and each assignable address includes one assignable host LUN ID of the second target LUN. The address obtaining module 902 is further configured to obtain a valid address of a level 1 LUN from the assignable-address set of the second source LUN and the assignable-address set of the second target LUN, where the valid address of a level 1 LUN is one assignable address in an intersection of the plurality of assignable addresses of the second source LUN and the plurality of assignable addresses of the second target LUN, and the valid address includes the host LUN ID of the second source LUN. The sending module 903 is further configured to send the valid address of a level 1 LUN to the first storage array and send the valid address of a level 1 LUN to the second storage array.

In hardware implementation, the receiving module 901 may be implemented by the processor 802 running the program code in the memory, or may be independently implemented by the processor 802. The address obtaining module 902 may be implemented by the processor 802 running the program code in the memory, or may be independently implemented by the processor 802. The sending module 903 may be implemented by the processor 802 running the program code in the memory, or may be independently implemented by the processor 802.

A person of ordinary skill in the art may understand that each aspect of the present invention or a possible implementation of each aspect may be specifically implemented as a system, a method, or a computer program product. Therefore, each aspect of the present invention or a possible implementation of each aspect may use hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation of each aspect may take a form of a computer program product, where the computer program product is computer-readable program code stored in a computer-readable storage medium.

The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), or an optical disk.

A processor in the computer reads the computer-readable program code in the computer-readable medium, so that the processor can execute a functional action specified in each step or a combination of steps in a flowchart.

The computer-readable program code may be completely executed on a user's computer, may be partially executed on a user's computer, may be implemented as a standalone software package, may be partially implemented on a user's computer and partially implemented on a remote computer, or may be completely executed on a remote computer or a server. It should also be noted that, in some alternative implementation solutions, each step in the flowcharts or functions specified in each block in the block diagrams may not occur in the illustrated order. For example, two steps or blocks that depend on an involved function and are shown in sequence may be actually executed concurrently, or sometimes these blocks may be executed in reverse order.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person of ordinary skill in the art may use a different method to implement the described functions for each particular application, but it should not be considered that the implementation goes beyond the scope of the present invention. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A storage system comprising:
    a first storage array comprising a first logical unit number (LUN);
    a second storage array comprising a second LUN, wherein the first LUN and the second LUN form a pair of active-active LUNs; and
    an address assignment apparatus,
    wherein the first storage array is configured to send a plurality of assignable address labels for the first LUN to the address assignment apparatus, wherein the second storage array is configured to send a plurality of assignable address labels for the second LUN to the address assignment apparatus, wherein the address assignment apparatus is configured to:

select an assignable address label for both the first LUN and the second LUN, the selected assignable address label being located in both the assignable address labels for the first LUN and the assignable address labels for the second LUN;

send the selected assignable address label to the first storage array as a label for identifying the first LUN; and send the selected assignable address label to the second storage array as a label for identifying the second LUN.

2. The storage system according to claim 1, wherein the address assignment apparatus is further configured to:

send a first address query command to the first storage array to query the plurality of assignable address labels for the first LUN; and send a second address query command to the second storage array to query the plurality of assignable address labels for the second LUN.

3. The storage system according to claim 1, wherein the first storage array is further configured to generate the plurality of assignable address labels for the first LUN; and the second storage array is further configured to generate the plurality of assignable address labels for the second LUN.

4. The storage system according to claim 1, wherein the storage system comprises a host, and the address assignment apparatus is located in a host.

5. An address assignment apparatus comprising:

an interface configured for communicating with a first storage array and a second storage array, wherein the first storage array comprises a first logical unit number (LUN), the second storage array comprises a second LUN, wherein the first LUN and the second LUN form a pair of active-active LUNs; and a processor configured to:

receive, via the interface, assignable address labels for the first LUN sent by the first storage array;

receive, via the interface, assignable address labels for the first LUN sent by the second storage array;

select an assignable address label for both the first LUN and the second LUN, the selected assignable address label being located in both the assignable address labels for the first LUN and the assignable address labels for the second LUN;

send the selected assignable address label to the first storage array as a label for identifying the first LUN; and send the selected assignable address label to the second storage array as a label for identifying the second LUN.

6. The address assignment apparatus according to claim 5, wherein the processor is further configured to:

send a first address query command to the first storage array to query the assignable address labels for the first LUN; and send a second address query command to the second storage array to query the assignable address labels for the second LUN.

7. An address assignment method performed by an address assignment apparatus in a storage system, comprising:

receiving, from a first storage array in the storage system, assignable address labels for a first logical unit number (LUN) of the first storage array;

receiving, from a second storage array in the storage system, assignable address labels for a second LUN of the second storage array, wherein the first LUN and the second LUN form a pair of active-active LUNs;

selecting an assignable address label for both the first LUN and the second LUN, the selected assignable address label being located in both the assignable address labels for the first LUN and the assignable address labels for the second LUN;

sending the selected assignable address label to the first storage array as a label for identifying the first LUN; and sending the selected assignable address label to the second storage array as a label for identifying the second LUN.

8. The method according to claim 7, further comprising:

sending a first address query command to the first storage array to query the assignable address labels for the first LUN; and sending a second address query command to the second storage array to query the assignable address labels for the second LUN.

* * * * *